A. BURGGALLER.
REFUSE RECEPTACLE.
APPLICATION FILED FEB. 19, 1912.
1,062,270.
Patented May 20, 1913.
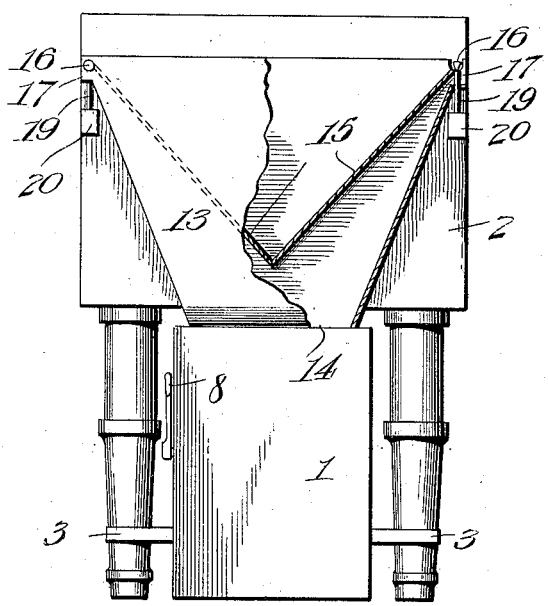
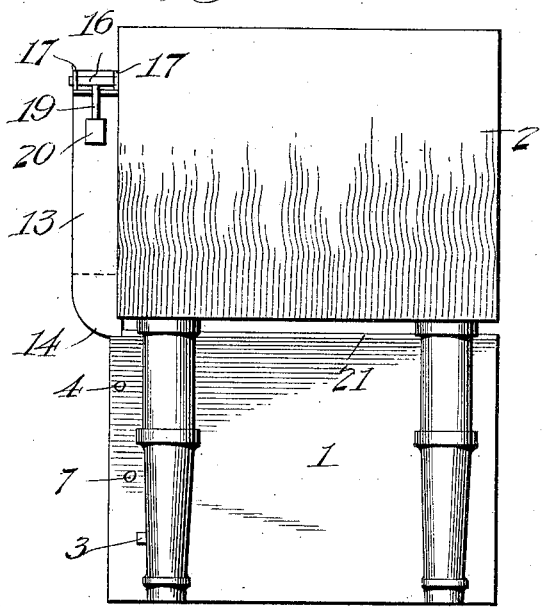
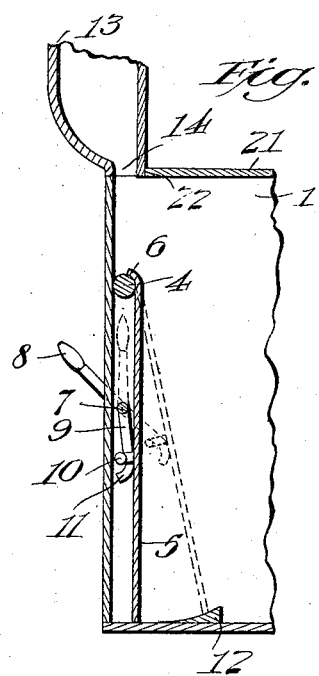
Witnesses
T. L. Mactanee
H. Joseph Doyle
Inventor
Adolph Burggaller,
By W. N. Roach, Jr.
Attorney
COLUMBIA PLANOGRAPH CO., WASHINGTON, D. C.

UNITED STATES PATENT OFFICE.

ADOLPH BURGGALLER, OF WEST HOBOKEN, NEW JERSEY.

REFUSE-RECEPTACLE.

1,062,270. Specification of Letters Patent. Patented May 20, 1913.

Application filed February 19, 1912. Serial No. 678,465.

*To all whom it may concern:*

Be it known that I, ADOLPH BURGGALLER, a citizen of the United States of America, residing at West Hoboken, in the county of Hudson and State of New Jersey, have invented certain new and useful Improvements in Refuse-Receptacles, of which the following is a specification.

This invention relates to receptacles for waste materials, such as cuttings and other waste that accumulate on chopping or cutting blocks or tables, and the principal object of the same is to provide a receptacle for waste material in which novel means are provided for distributing the material therein so that the outlet of the feeder will not become choked or clogged, and also to provide a novel type of feeder that coöperates with the receptacle and which is provided with means for closing the outlet of the feeder which are automatically operated by material entering the feeder to open the outlet so that the material will flow to the receptacle.

In carrying out the objects of the invention as generally stated above, it will be understood, of course, that the essential features thereof are necessarily susceptible to change in details and structural arrangements, one simple and practical embodiment of which is shown in the accompanying drawings, wherein—

Figure 1 is an end view of a chopping block or table showing this invention associated therewith, the feeder being shown partly in section. Fig. 2 is a view in side elevation thereof. Fig. 3 is a fragmentary vertical sectional view of the feeder and receptacle.

The improved refuse receiver comprises a receptacle 1 that is preferably of a size to permit the same to be disposed beneath a cutting or chopping table 2, the receptacle being preferably provided with external lugs or stops 3 that engage the legs of the table to prevent accidental displacement of the receptacle. At one side, and preferably adjacent the upper portion of the receptacle, rod 4 extends longitudinally across the receptacle, the rod 4 being disposed adjacent to one side of said receptacle. A scraper 5, preferably formed of flat sheet metal, has its upper edge portion 6 hinged to the rod 4, to permit the free lower edge of the said scraper to swing toward, or away from, the center of the receptacle 1. A rocker shaft 7 extends longitudinally across the receptacle 1 and one end thereof projects through and beyond one end of said receptacle and has a handle 8 mounted thereon so that by manipulating the said handle 8 the shaft 7 can be readily rocked. Within the receptacle 1, shaft 7 carries a crank arm 9 that extends through a ring, or eye, 10, carried by scraper 5. The free end 11 of crank 9 is preferably curved so that it will not be accidentally disengaged from the ring 10. As thus described, it will be clear that when the shaft 7 is rocked, the crank 9 will impart a similar movement to the scraper 5, so that the material will be prevented from filling the side of the receptacle. In this connection, it will be observed by referring to Fig. 3 of the drawings, that the bottom of the receptacle 1 is provided with a guard 12 that has its upper surface curved to conform to the arc in which the lower edge of the scraper travels, the guard by means of its enlarged end portion serving to prevent material getting behind the said scraper.

The waste material is fed to the receptacle 1 through a hopper 13 which is carried by one end of the table 2 and may have its outlet, or discharge end, 14 curved inward so that it will extend beneath the table and discharge directly into said receptacle 1. The interior of the hopper is provided with a pair of trap doors 15, the upper ends of which carry pivot shafts 16 that are journaled in the ears 17 of said hopper. Arms 19 depend from the pivot shafts 16 and carry counterweights 20 that normally hold the doors 15 with their lower ends in contact so that a pocket is formed in the hopper 13. With the described type of feeder or hopper, it will be clear that the waste material can be readily brushed from the table 2 into the hopper, and that when the weight of the material on the doors 15 overcomes the weights 20, the said doors automatically open and the material flows to the receptacle 1, after which the said weights 20 automatically close the said doors.

As is shown in Figs. 2 and 3 of the drawings, the receptacle 1 is provided with a cover 21 that permits access to be had to the interior of the receptacle. The cover is provided with an opening 22 through which the discharge end 14 of the hopper projects. Preferably the discharge end 14 of the hopper fits snugly in the cover opening 22 so that flies and other insects cannot enter the receptacle. By this arrangement it will be seen that, as the doors 15 are normally closed, no odors can escape from the receptacle.

From the foregoing description it will be clear that this invention provides an efficient receiver for waste materials that is of special value in connection with meat chopping blocks, or other cutting stands or tables; that the described counterweighted doors provide simple means for keeping the feeder closed when material is not passing therethrough, and that the scraper in the receptacle provides simple means for distributing the material so that the material will not pile.

Having described my invention, what I claim as new and desire to secure by Letters Patent, is:—

1. A receiver for waste material comprising a feeder, a receptacle, a scraper pivotally mounted in the receptacle and having a free lower end, a guard over which the scraper swings, said guard having its upper surface curved to conform to the arc in which the free end of the scraper swings and having an enlarged end that serves as an abutment for preventing material getting behind said scraper, said guard having its upper surface curved to conform to the arc in which the lower end of the scraper swings, and means for operating the scraper.

2. A receiver for waste material comprising a feeder, a receptacle, a scraper having its upper end pivotally mounted in the receptacle, a ring carried by the scraper, a rocker shaft in the receptacle and having a projecting end, a crank carried by the shaft and engaging the ring, and a handle carried by the projecting end of the rocker shaft.

3. In an apparatus of the character described the combination of a feeder adapted to be carried by a chopping table, a receiver adapted to be fitted beneath the table and provided with table leg-engaging lugs, and a cover for the receiver provided with an opening with which the discharge outlet of the feeder communicates.

4. An apparatus of the character described comprising a receiver, a scraper pivotally mounted therein, a rocker shaft within the receiver, an eye carried by the scraper, a crank carried by the rocker shaft and having a curved free end that extends through said eye, means for operating the shaft, and means for feeding material to the receiver.

5. A device of the character described comprising a hopper-shaped feeder provided with pivot ears at opposite portions of its inlet end, the ears being arranged in pairs, doors within the hopper and having pivot shafts at their upper ends, arms projecting from said shafts that are mounted in the ears, weights carried by said arms for normally holding the lower ends of the doors in contact, and a receiver in communication with the outlet of the feeder.

In testimony whereof I hereunto affix my signature in presence of two witnesses.

ADOLPH BURGGALLER.

Witnesses:
Wm. J. Cotterell,
Edwin J. Cotterell.

---

Copies of this patent may be obtained for five cents each, by addressing the "Commissioner of Patents, Washington, D. C."